Oct. 15, 1929.　　G. S. CLEMENT　　1,732,081
RADIATOR STAND
Filed Sept. 10, 1928
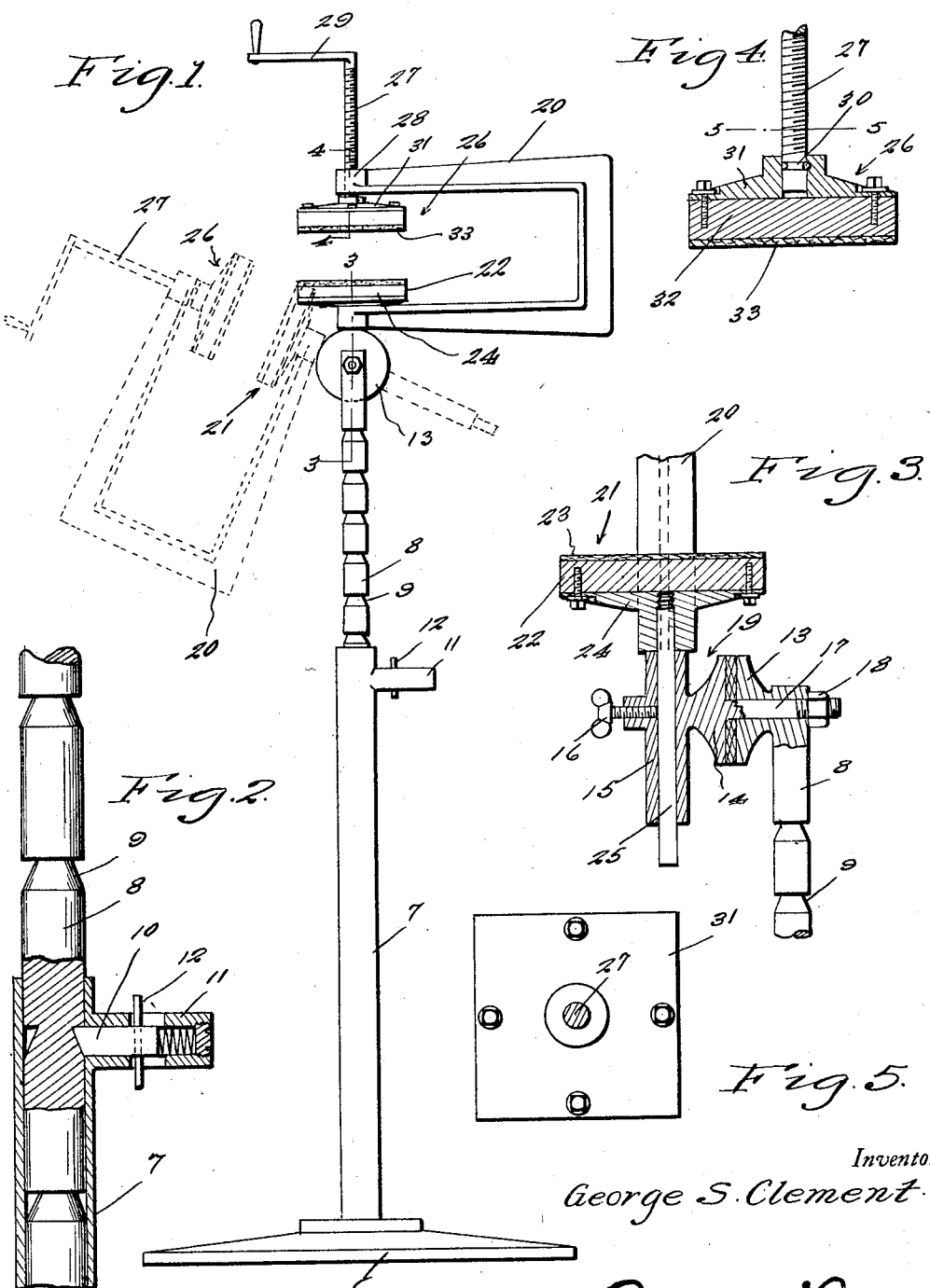
Inventor
George S. Clement
By Clarence A. O'Brien
Attorney Patented Oct. 15, 1929

1,732,081

UNITED STATES PATENT OFFICE

GEORGE S. CLEMENT, OF EDNA, TEXAS

RADIATOR STAND

Application filed September 10, 1928. Serial No. 305,090.

This invention relates to an improved radiator stand especially adapted for use in automobile and motor vehicle repair shops where it may be used for supporting a vehicle radiator while working on it and making repairs thereto.

Briefly, the invention comprises a base, a vertically adjustable standard rising therefrom and a novel head structure on the upper end of the standard adjustably mounted and including clamping and retaining means.

My principal aim is to generally improve upon structures of this class by providing one which is characterized by compactness and convenience in the arrangement of parts, practicability, durability, adjustability, and such other desirable features as make the complete structure positive and dependable in action, efficient in performance and otherwise capable of fulfilling the requirements of a device of this class in a suitable manner.

In the drawings:

Fig. 1 is an elevational view of the complete stand constructed in accordance with the present invention and showing the manner in which the head may be adjusted to one side.

Fig. 2 is a fragmentary section and elevational view on an enlarged scale showing the retaining latch construction.

Figure 3 is an enlarged fragmentary detail section, taken approximately upon the plane of the line 3—3 of Figure 1.

Figure 4 is a similar sectional and elevational view, the section being taken respectively on the line 4—4 of Figure 1.

Fig. 5 is a section on the line 5—5 of Fig. 4.

Referring now to the drawings by reference numerals, it will be seen that 6 designates the base which carries an upstanding standard including a stationary tube 7 and a shank member telescopically arranged therein. This shank member 8 is provided with circumferential grooves 9 forming shoulders with which a spring pressed latch 10 is cooperable, as shown in Fig. 2. This latch is slidably mounted in an extension 11 on one side of the tube 7. The latch is formed with suitable operating means or handles 12 thus permitting the shank portion to be elevated to the desired position. The upper end of the shank portion is provided with a laterally disposed disc-like portion 13 with which a complemental disc-like portion 14 is cooperable. This portion 14 carries a sleeve 15 and a retaining set screw 16. Moreover this portion 14 is provided with a clamping bolt 17 extending through the shank and provided with a retaining nut 18. Thus, the portions 14, 15 and 16 provide a special fixture 19 which can be adjusted about the horizontal axis formed by the bolt 17.

The head structure includes a substantially U-shaped frame 20 whose lower arm is provided with a rigidly mounted clamping head 21. As shown in Fig. 3 this comprises a square wooden block 22, a felt facing 23 and small bolts connecting the blocks to the outstanding flanges 24 on the lower arm of the frame. The lower arm of the frame carries a removable stem connection 25 which extends down through the sleeve 15 and is adjustably connected thereto by the set screw 16 as shown in Fig. 3. Supported on the upper arm is a complemental relatively adjustable clamp 26.

The clamp 26 embodies a screw threaded shaft 27 threaded through a screw collar 28 formed on the end portions of the arm of the U-frame. On one end this shaft is provided with crank handle 29 and the opposite end thereof is swivelly connected as at 30 with a reinforcing and backing member 31. The backing member is bolted to a wooden block carrying a felt covering or facing 33. The two clamps are disposed opposite each other so as to permit the radiator to be connectively clamped therebetween and upon the frame. The entire head comprising the frame of the two clamping members may be removed by loosening the set screw 16 and lifting the head off, with or without the radiator. When the radiator is put in position it is clamped firmly with the clamping members 21 and 26 and it is thereafter permitted to be adjusted from one side to the other as indicated in dotted lines in Fig. 1 whereby to position it in an effective position for repair work.

It is thought that by considering the description in connection with the drawings that a clear understanding of the construction and operation of the invention will be had. Consequently, a more lengthy description of the invention is regarded unnecessary.

Minor changes in shape, size and rearrangement of parts coming within the field of invention claimed may be resorted to in actual practice if desired.

I claim:—

1. A radiator stand of the class described comprising a base, a vertically extensible standard rising from said base, the extensible section of said standard being formed at its upper end with a laterally disposed disc-like element, a fixture cooperable with said element and including a vertically disposed sleeve, a lateral disc-like element cooperable with said first named disc-like element, a bolt carried by said last named disc-like element and pivotally connecting said fixture with the extensible section of the standard and a retaining screw carried by said sleeve.

2. A radiator stand of the class described comprising a base, a vertically extensible standard rising from said base, the extensible section of said standard being formed at its upper end with a laterally disposed disc-like element, a fixture cooperable with said element and including a vertically disposed sleeve, a lateral disc-like element cooperable with said first named disc-like element, a bolt carried by said last named disc-like element and pivotally connecting said fixture with the extensible section of the standard and a retaining screw carried by said sleeve, together with a frame provided with clamping means and with a removable stem element, said stem element being adapted for removable reception in said sleeve.

In testimony whereof I affix my signature.

GEORGE S. CLEMENT.